United States Patent
Arai et al.

(10) Patent No.: US 8,477,570 B2
(45) Date of Patent: Jul. 2, 2013

(54) THERMALLY ASSISTED MAGNETIC HEAD ASSEMBLY AND MAGNETIC DISK DEVICE

(75) Inventors: Satoshi Arai, Yokohama (JP); Irizo Naniwa, Fujisawa (JP); Junichiro Shimizu, Hadano (JP); Takuya Matsumoto, Sunnyvale, CA (US); Shigeyuki Sasaki, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 123 days.

(21) Appl. No.: 13/143,739

(22) PCT Filed: Nov. 30, 2009

(86) PCT No.: PCT/JP2009/070090
§ 371 (c)(1),
(2), (4) Date: Aug. 24, 2011

(87) PCT Pub. No.: WO2010/103697
PCT Pub. Date: Sep. 16, 2010

(65) Prior Publication Data
US 2012/0320719 A1 Dec. 20, 2012

(30) Foreign Application Priority Data
Mar. 11, 2009 (JP) .................................. 2009-057961

(51) Int. Cl.
*G11B 11/00* (2006.01)
(52) U.S. Cl.
USPC .................... 369/13.33; 369/13.13; 369/13.17
(58) Field of Classification Search
USPC .......... 369/13.33, 13.32, 13.24, 13.14, 13.03, 369/13.02, 13.12, 13.13, 13.01, 13.35, 13.17, 369/112.27, 300; 360/59, 125.31, 125.74, 360/128; 720/659
See application file for complete search history.

(56) References Cited

U.S. PATENT DOCUMENTS

| | | | |
|---|---|---|---|
| 5,696,652 A | 12/1997 | Satoh | |
| 7,921,436 B2* | 4/2011 | Shimizu et al. | 720/659 |
| 7,957,085 B2* | 6/2011 | Tanaka et al. | 360/59 |
| 7,974,043 B2* | 7/2011 | Shimazawa et al. | 360/125.31 |

(Continued)

FOREIGN PATENT DOCUMENTS

| | | |
|---|---|---|
| JP | 6-60346 A | 3/1994 |
| JP | 3354751 B2 | 9/2002 |

(Continued)

OTHER PUBLICATIONS

International Search Report dated Dec. 28, 2009 (one (1) page).

(Continued)

*Primary Examiner* — Ali Neyzari
(74) *Attorney, Agent, or Firm* — Crowell & Moring LLP (57) ABSTRACT

A slider including a magnetic head part, an optical waveguide, and a near field element is fixed by first and second adhesives to a submount on which a semiconductor laser and a mirror are mounted, the mirror being placed at one end of the semiconductor laser in a resonance direction thereof and reflecting a laser in a direction intersecting with the resonance direction. At this time, at least parts of the first and second adhesives are applied to a position opposed to the semiconductor laser with an intermediation of the submount. The first adhesive having a higher Young's modulus than that of the second adhesive is applied onto an inflow end side of the slider including a solder connection portion, the second adhesive being applied onto an outflow end side of the slider.

14 Claims, 8 Drawing Sheets

U.S. PATENT DOCUMENTS

| | | | |
|---|---|---|---|
| 8,270,262 B2 * | 9/2012 | Naniwa et al. | 369/30.03 |
| 8,300,503 B2 * | 10/2012 | Arai et al. | 369/13.32 |
| 2008/0055763 A1 | 3/2008 | Tanaka et al. | |
| 2008/0316872 A1 | 12/2008 | Shimizu et al. | |

FOREIGN PATENT DOCUMENTS

| | | |
|---|---|---|
| JP | 2003-109338 A | 4/2003 |
| JP | 2008-59695 A | 3/2008 |
| JP | 2009-4030 A | 1/2009 |

OTHER PUBLICATIONS

Form PCT/ISA/237 dated Dec. 28, 2009 (three (3) pages).

* cited by examiner

THERMALLY ASSISTED MAGNETIC HEAD ASSEMBLY AND MAGNETIC DISK DEVICE

TECHNICAL FIELD

The present invention relates to a technology of mounting a thermally assisted magnetic recording head assembly which applies a magnetic field to a magnetic recording medium heated by near field light to thereby record information. Specifically, the present invention relates to an adhesion structure between a slider on which an element for thermally assisted magnetic recording is mounted and a submount on which a semiconductor laser is mounted. In addition, the present invention relates to a magnetic disk device on which the thermally assisted magnetic head assembly including the adhesion structure is mounted.

BACKGROUND ART

In recent years, an optical-magnetic hybrid recording technology in which optical recording and magnetic recording are combined with each other has been proposed as one of technologies for improving a recording density of a magnetic disk device. This technology adopts a method of heating, at the time of recording, a medium at the same time as generation of an applied magnetic field to thereby reduce a retention force of the medium. The adoption of this method makes it possible to facilitate recording into a recording medium having such a high retention force that recording by a conventional magnetic head is difficult due to an insufficient recording magnetic field intensity. On the other hand, for reproduction, a magnetoresistance effect used in conventional magnetic recording is utilized.

This hybrid recording method is referred to as thermally assisted magnetic recording. Here, a method of using a near field has been proposed as a heat method using light. In the thermally assisted magnetic recording using a near field, laser light generated by a laser light source is guided to a recording head, and a light spot diameter is converted into a size and a shape which is suitable for recording, by using an element having a function of generating near field light. Hereinafter, the element having the function of generating near field light as described above is referred to as a near field light generation element.

Normally, for the necessity of using the laser light source inside of a package of a disk drive, a small-sized semiconductor laser (LD: Laser Diode) with low power consumption is used among laser light sources. When the laser light source is used in a thermally assisted magnetic recording device using a near field which realizes a recording density of Tb/in$^2$ or more, a power of approximately several mW is required before a recording medium surface is reached.

Optical components which guide the laser light generated by the semiconductor laser to the near field generation element include a reflection mirror, a lens, and an optical waveguide. The light generated by the semiconductor laser passes through the optical components and the near field generation element placed in an optical path, and reaches a recording medium. The light intensity of the laser light decreases while passing through the optical path, and becomes several tens of percent of an output of the light generated by the semiconductor laser. Main causes of the decrease in light intensity include: absorption loss and scattering loss when the light passes through the optical components; coupling loss resulting from deviation from an ideal position which occurs at the time of mounting or adhesion of the optical components and at the time of soldering; and the like. Accordingly, in the thermally assisted magnetic recording, a structure in which the coupling loss occurring until the light enters the near field generation element is reduced is essential.

Meanwhile, downsizing of a slider of a magnetic disk is advancing. For example, at present, a femto slider having a size of 0.85 mm×0.7 mm×0.23 mm is becoming mainstream. In addition, a distance between a floating surface (ABS: Air Bearing Surface) and a disk has reached as small as approximately 10 nm. The downsizing thereof will further advance thereafter, and the floating amount is expected to become smaller. However, in the case of the further advance in downsizing and the smaller floating amount, it is predicted that warpage of the slider itself will become a big problem. In addition, in order to reduce loss of the laser light, it is effective to place the semiconductor laser in the vicinity of the slider. However, it is known that, because the semiconductor laser itself becomes a heat source, if uniform heat radiation to the slider is not possible, deformation of the slider due to the heat is accelerated, and the lifetime of the semiconductor laser is degraded. Therefore, a structure in which the heat is radiated to the slider with high efficiency is essential. As described above, realization of the thermally assisted magnetic recording head is expected to essentially require not only the structure in which the coupling loss is reduced by the decrease in position deviation but also the mounting structure in which the heat can be radiated to the slider with high efficiency while suppressing the warpage of the slider.

It should be noted that Patent Literature 1 discloses a fixing method in which a heat curing adhesive and a UV adhesive are used for fixing a slider and a flexure to each other, and fluctuations in attachment dimensions are thus reduced, whereby enhancement in accuracy is achieved. In addition, Patent Literature 2 discloses a magnetic head in which an adhesive having both properties of light curing and heat curing is applied to a joint portion between a slider and a flexure, and a heat curing adhesive and a conductive adhesive for electrical conduction are applied to a region other than an application region of the adhesive, whereby the adhesion strength between the slider and the flexure is enhanced. In addition, Patent Literature 3 discloses a thermally assisted magnetic head in which a concave surface is formed in at least part of an adhesion surface of a light source support substrate to be adhered to a slider, whereby a position of a light source can be adjusted with high accuracy.

CITATION LIST

Patent Literature

Patent Literature 1: JP Patent Publication (Kokai) No. 6-60346 A (1994)
Patent Literature 2: JP Patent No. 3354751
Patent Literature 3: JP Patent Publication (Kokai) No. 2008-59695 A

SUMMARY OF INVENTION

Technical Problem

Incidentally, Patent Literature 1 discloses a technology of fixing the flexure and the slider to each other by using the heat curing adhesive in a portion which is difficult to irradiate with ultraviolet rays because the portion is in the shadow of a load beam and using the UV adhesive in a portion which can be irradiated with ultraviolet rays. Unfortunately, the structure disclosed in Patent Literature 1 relates to an adhesion structure between the flexure and the slider of a conventional magnetic head, and, to begin with, a semiconductor laser which can serve as a heat source is not mounted. Therefore, heat radiation to the slider is not taken into consideration. In addition, the reason why the two types of adhesives are used is enhancement in adhesion strength. Therefore, there is no discussion about a difference in physical property value between the two types of adhesives, suppression of position deviation, and a position relation of the adhesives with a soldered portion.

Patent Literature 2 uses the three types of adhesives between the flexure and the slider, to thereby fix the flexure and the slider to each other. However, Patent Literature 2 also assumes the conventional magnetic head, and hence an optical waveguide necessary for optical coupling is not formed, so that an entire surface of the slider in the long-side direction thereof is adhered. Therefore, the structure disclosed in Patent Literature 2 cannot be applied to the thermally assisted magnetic head. In addition, a boundary is not defined between the three types of adhesives, and hence the adhesives mix with one another. As a result, hardening characteristics cannot be sufficiently satisfied, so that the adhesion strength decreases and a desired physical property cannot be obtained in many cases. Further, the reason why the three types of adhesives are used is the adhesion strength and prevention of electrostatic breakdown similarly to Patent Literature 1. Therefore, the heat radiation to the slider is not taken into consideration. Moreover, similarly to the case of Patent Literature 1, there is no discussion about a difference in physical property value between the three types of adhesives, suppression of position deviation, and a position relation of the adhesives with a soldered portion.

According to Patent Literature 3, the concave portion is formed on the adhesion surface to the slider, of the light source support substrate on which the semiconductor laser is mounted, and the concave portion serves to suppress an outflow of the adhesives. However, application of only the one type of adhesive to the concave portion causes some problems about a heat radiation property and suppression of position deviation.

Solution to Problem

In view of the above, the present invention proposes a structure of a thermally assisted magnetic recording head assembly which efficiently propagates light from a semiconductor laser to a waveguide formed in a slider while securing a property of heat radiation to the slider and a floating property, to thereby make it possible to deal with a high density.

Specifically, the present invention proposes a connection structure between: a slider including a magnetic head part, an optical waveguide, and a near field element (a slider including a thermally assisted magnetic head and a waveguide); and a submount on which a semiconductor laser and a mirror are mounted, the mirror being placed at one end of the semiconductor laser in a resonance direction thereof and reflecting a laser in a direction intersecting with the resonance direction. It should be noted that, in this connection structure, at least parts of the first and second adhesives, which fix the slider and the submount to each other on an attachment surface, are applied to a position opposed to the semiconductor laser with an intermediation of the submount. In addition, the first adhesive having a higher Young's modulus than that of the second adhesive is applied on an inflow end side of the slider (the inflow side of air) including a solder connection portion, the second adhesive being applied onto an outflow end side of the slider (the outflow side of air). With this connection structure, it is possible to suppress position deviation between the slider and the submount, and thus realize satisfactory optical coupling. In addition, because at least parts of the adhesives are applied to the position opposed to the semiconductor laser, heat of the semiconductor laser can be released to the slider side with high efficiency.

It should be noted that, in the above-mentioned connection structure, it is desirable that thermal conductivity of the first adhesive be higher than that of the second adhesive. The adoption of this structure makes it possible to suppress thermal conduction to the first adhesive at the time of solder connection, and thus suppress deformation of the first adhesive. Accordingly, warpage of the slider is further suppressed, and a satisfactory floating property can be realized.

In addition, in the above-mentioned connection structure, it is desirable that thicknesses of the first and second adhesives be set so as to be the same as a distance between the slider and the submount and that the first and second adhesives do not flow out of an end portion of the slider. The adoption of this structure makes it possible to prevent formation of a fillet which causes warpage of the slider.

In addition, in the above-mentioned connection structure, it is desirable that the semiconductor laser be mounted so that an entirety thereof is housed in a concave portion formed in the submount. The adoption of this structure makes it possible to suppress attachment of a conductive adhesive to a surface of an active layer of the semiconductor laser, and thus prevent a short circuit.

In addition, in the above-mentioned connection structure, it is desirable that at least two alignment marks on the semiconductor laser be formed symmetrically with respect to a mesa portion and that shapes of the at least two alignment marks located symmetrically be different from each other. The adoption of this structure makes it possible to enhance alignment accuracy.

In addition, in the above-mentioned connection structure, it is desirable that a maximum size of filler in the first adhesive be smaller than a height of a stud formed on the submount. The adoption of this structure makes it possible to realize a reduction in thickness of the adhesives and suppression of deviation at the time of mounting the slider.

In addition, in the above-mentioned connection structure, it is desirable that a portion between the waveguide and a surface of the semiconductor laser through which light passes be filled with the transparent second adhesive or a transparent third adhesive. The adoption of this structure makes it possible to reduce an effective distance until the same spot size of laser light is reached.

In addition, in the above-mentioned connection structure, it is desirable that part of a periphery of an active layer of the semiconductor laser be surrounded by the first and second adhesives or a thermoplastic resin. The adoption of this structure makes it possible to effectively suppress a short circuit between electrodes.

In addition, in the above-mentioned connection structure, it is desirable that a part or an entirety of an end portion of the semiconductor laser be surrounded by an adhesive or a thermoplastic resin. The adoption of this structure makes it possible to effectively suppress scatter of dust of the semiconductor attaching to the semiconductor laser and the submount.

In addition, in the above-mentioned connection structure, it is desirable that a fillet be formed in at least part of end portions of the slider and the submount by using a heat radiation material. The adoption of this structure makes it possible to further enhance the heat radiation efficiency. In addition, it is desirable that an elastic modulus or a hardness of the heat radiation material be smaller than those of the first and second adhesives.

In addition, in the above-mentioned connection structure, it is desirable that an outer peripheral portion of the second adhesive be surrounded by a stud formed on the submount. The adoption of this structure makes it possible to prevent the second adhesive from flowing out into an unnecessary portion.

In addition, in the above-mentioned connection structure, it is desirable that an adhesion area of the second adhesive be larger than an adhesion area of the first adhesive. The adoption of this structure makes it possible to suppress warpage caused by the first adhesive and also radiate heat.

Advantageous Effects of Invention

According to the present invention, it is possible to suppress position deviation between the slider and the submount, and thus realize satisfactory optical coupling. In addition, because at least parts of the adhesives are applied to the position opposed to the semiconductor laser, heat of the semiconductor laser can be released to the slider side with high efficiency. Accordingly, non-uniform deformation of the slider during an operation of the semiconductor laser can be reduced. As a result, an excellent floating property can be satisfied, and an extension of the lifetime of the semiconductor laser can be realized. In this way, a thermally assisted magnetic recording head assembly which can deal with high density recording can be realized.

REFERENCE SIGNS LIST

1 . . . semiconductor laser, 2 . . . active layer, 3 . . . reflection mirror, 4 . . . n-type electrode of semiconductor laser, 5 . . . p-type electrode of semiconductor laser, 6 . . . alignment mark on semiconductor laser, 7 . . . mesa portion, 10 . . . submount, 11 . . . thin-film solder, 12 . . . electrode for connecting with p-type electrode of semiconductor laser, 13 . . . concave portion in submount, 14 . . . stud, 15 . . . through hole, 16 . . . electrode for connecting with slider, 17 . . . solder ball, 18 . . . alignment mark on submount, 20 . . . slider, 21 . . . magnetic recording/detection element, 22 . . . near field generation element, 23 . . . core of optical waveguide, 24 . . . clad of optical waveguide, 25 . . . electrode of slider, 30 . . . first adhesive, 31 . . . second adhesive, 32 . . . conductive adhesive, 33 . . . third adhesive, 34 . . . heat radiation material, 35 . . . adhesive, 36 . . . resin, 37 . . . resin, 40 . . . flexure, 41 . . . electrode, 50 . . . suspension, 51 . . . dimple, 60 . . . casing, 61 . . . magnetic disk, 62 . . . spindle motor, 63 . . . arm, 64 . . . voice coil motor, 65 . . . LSI for signal processing, 66 . . . ramp, 100 . . . thermally assisted magnetic head assembly, 200 . . . magnetic disk drive device

DESCRIPTION OF EMBODIMENTS

Hereinafter, embodiments of the present invention are described with reference to the drawings. It should be noted that the contents of a device configuration and a processing operation to be described later are given as an example for describing the invention, and the present invention encompasses: an invention obtained by combining a known technology with the device configuration and the processing operation to be described later; and an invention obtained by replacing part of the device configuration and the processing operation to be described later with a known technology.

Hereinafter, a connection structure example of a thermally assisted magnetic recording head assembly is described with reference to the drawings. Main components of the thermally assisted magnetic recording head assembly are a slider, a semiconductor laser, and a submount. Here, main elements constituting the slider are an optical waveguide, a near field generation element, and a magnetic recording/detection element (magnetic head part). Then, the semiconductor laser having an end surface in the vicinity of which a reflection mirror is formed is mounted on the submount. The temperature of the semiconductor laser becomes higher during its operation, and there is a close relationship between the temperature at this time and the light emission property and the lifetime. Accordingly, in order to secure the heat radiation property, it is desirable that a junction-down structure in which an active layer is formed at a position close to a connection surface be adopted for connection between the semiconductor laser and the submount on which the semiconductor laser is mounted. In addition, in order to avoid a change over time in relative position of the semiconductor laser and the submount with respect to the optical waveguide which propagates light, it is preferable to use Au—Sn solder with extremely small creep deformation. In addition, if satisfactory heat radiation cannot be secured, there arises not only a problem that the lifetime of the semiconductor laser is degraded but also a problem that warpage of the slider is caused by an operation. If the degree of such warpage becomes higher, the floating property is deteriorated. Therefore, it is essential to efficiently release heat of the semiconductor laser to the slider. Accordingly, it is desirable to use, as a material of a substrate, a material having a high thermal conductivity and a coefficient of thermal expansion which is close to those of a substrate material (GaAs) of the semiconductor laser and a slider material (AlTiC). Specifically, the material of the substrate may be selected from SiC, $Al_2O_3$, AlN, Si, AlTiC, and the like in consideration of workability and the like. It is preferable to set the thickness of the substrate to approximately 80 μm to 150 μm in view of the floating property, the stiffness property, and the like.

The optical waveguide is provided on one end surface of the slider so as to pass through the slider from an upper surface to a lower surface thereof in the thickness direction of the slider. Further, the near field generation element and the magnetic recording/detection element (magnetic head part) are provided on a floating surface (ABS: Air Bearing Surface) of the slider. AlTiC is conventionally used as a material of the slider. It is important to fix with high accuracy the materials having the above-mentioned configuration with the use of connection members such as an adhesive and a solder.

(1) Embodiment 1

Figure 1:
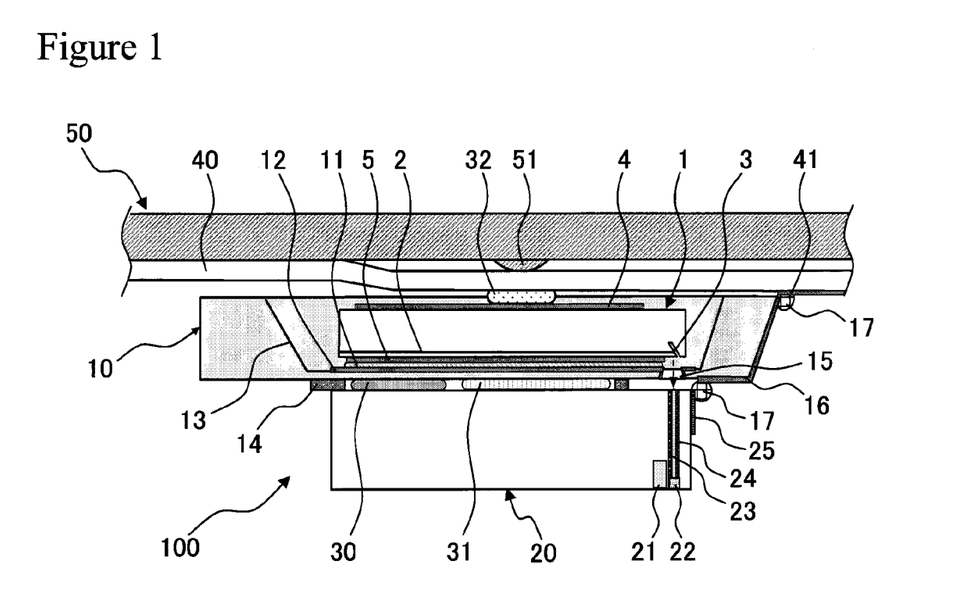
FIG. 1 is a view illustrating a cross sectional structure of a thermally assisted magnetic recording head assembly according to an embodiment.

FIG. 1 illustrates a cross sectional structure example of a thermally assisted magnetic recording head assembly 100 according to Embodiment 1. As illustrated in FIG. 1, the thermally assisted magnetic recording head assembly 100 includes a submount 10, a slider 20, and two types of adhesives 30 and 31 which fix these members to each other. A through hole 15 is formed in the submount 10 so as to face an optical waveguide formed on the slider 20 side. A semiconductor laser 1 is mounted on the submount 10, and a reflection mirror 3 is formed in the semiconductor laser 1 so as to guide laser light to the through hole 15. Specifically, the reflection mirror 3 is formed near an end surface of the semiconductor laser 1. The optical waveguide (a core 23 and a clad 24), a near field generation element 22, and a magnetic recording/detection element 21 are mounted on the slider 20. At least part of the two types of adhesives 30 and 31 which fix the submount 10 and the slider 20 to each other are applied so as to be located below the semiconductor laser 1 with the intermediation of the submount 10. At this time, the first adhesive 30 having a higher Young's modulus than that of the second adhesive 31 is applied onto an inflow side of the slider 20 in which a solder connection portion is formed, the second adhesive 31 being applied onto an outflow end side of the slider 20.

Figure 2:
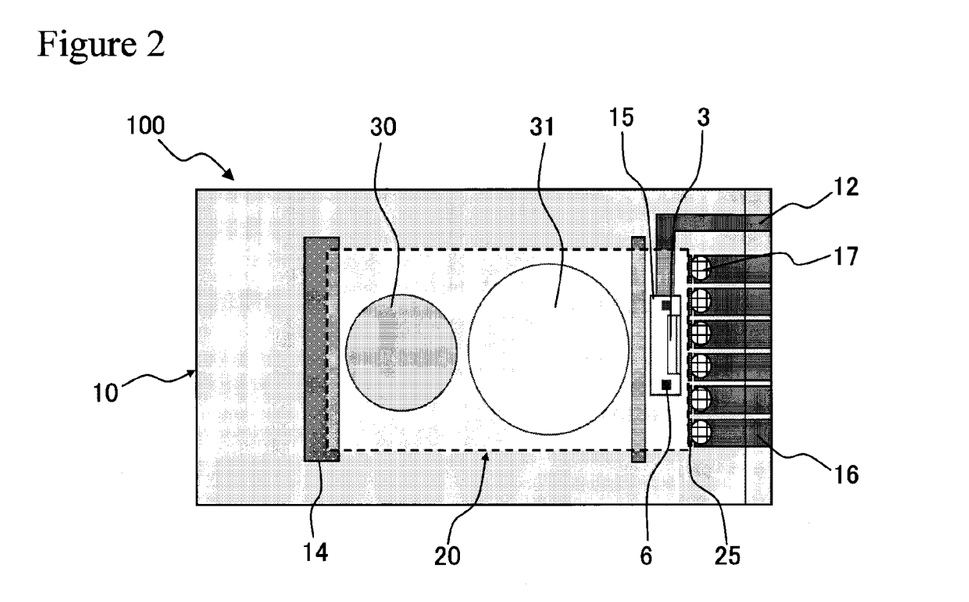
FIG. 2 is a view illustrating a planar structure of the thermally assisted magnetic recording head assembly according to the embodiment, which is observed from a slider side.
Figure 3:
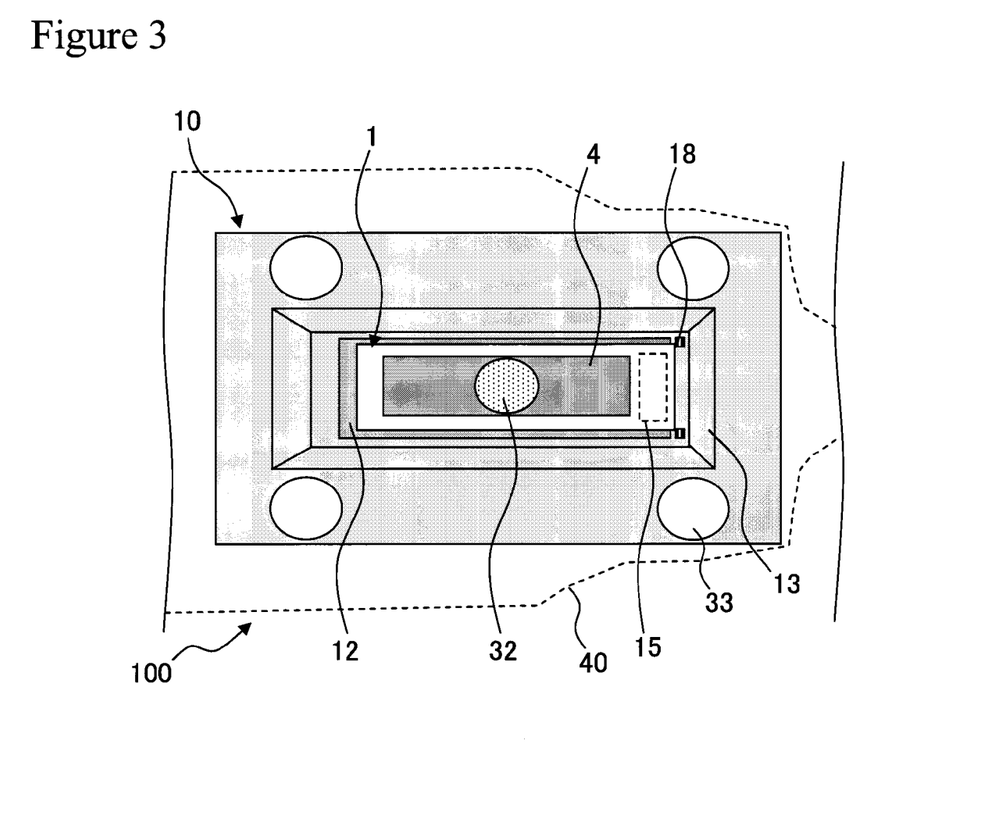
FIG. 3 is a view illustrating a planar structure of the thermally assisted magnetic recording head assembly according to the embodiment, which is observed from a flexure side.

FIG. 2 illustrates a planar structure example of the thermally assisted magnetic recording head assembly 100 according to Embodiment 1, which is observed from the slider 20 side. FIG. 3 illustrates a planar structure example of the thermally assisted magnetic recording head assembly 100 according to Embodiment 1, which is observed from a flexure 40 side.

Here, an assembly procedure of the thermally assisted magnetic recording head assembly 100 according to Embodiment 1 is described with reference to FIG. 1 to FIG. 3. First, the semiconductor laser 1 is mounted on a thin-film solder 11 in a concave portion 13 formed in the submount 10. At this time, the semiconductor laser 1 is positioned on the basis of alignment marks 6 formed on the semiconductor laser 1 and alignment marks 18 formed on the submount 10.

After that, the semiconductor laser 1 and the submount 10 are connected to each other by a reflow process. It should be noted that, from the point of view of the heat radiation property and position stability, it is preferable to use Au—Sn solder as the thin-film solder 11 formed in a flat portion (bottom surface portion) of the concave portion 13 in the submount 10, and the temperature applied at this time is generally equal to or higher than 300° C. In addition, in the case of the present embodiment, a p-type electrode 5 of the semiconductor laser 1 is provided on the solder connection side with the submount 10, and an n-type electrode 4 thereof is provided on the flexure 40 side. It should be noted that it is general to apply a positive electric potential to a lead connected to the p-type electrode 5 and apply a negative electric potential to a lead connected to the n-type electrode 4.

Next, with the use of a dispenser or the like, the two types of adhesives 30 and 31 are applied to a region sandwiched by a stud 14 on a surface opposite to the mounting surface of the semiconductor laser 1 (on the side of the submount 10 on which the concave portion 13 is not formed). After that, positioning is performed on the basis of the alignment marks 6 on the semiconductor laser 1 which can be observed via the through hole 15 formed in the submount 10 and alignment marks (not shown) formed on the slider 20, to thereby mount the slider 20 on the submount 10.

Here, it is desirable to use a conductive adhesive which is cured by heat or a conductive adhesive to which the UV curing property as well as the heat curing property is imparted, as the first adhesive 30 applied onto the inflow side of the slider 20. On the other hand, it is desirable to use an adhesive which does not contain filler and can be cured by both of UV and heat, as the second adhesive 31 applied onto the outflow side of the slider 20.

Figure 4:
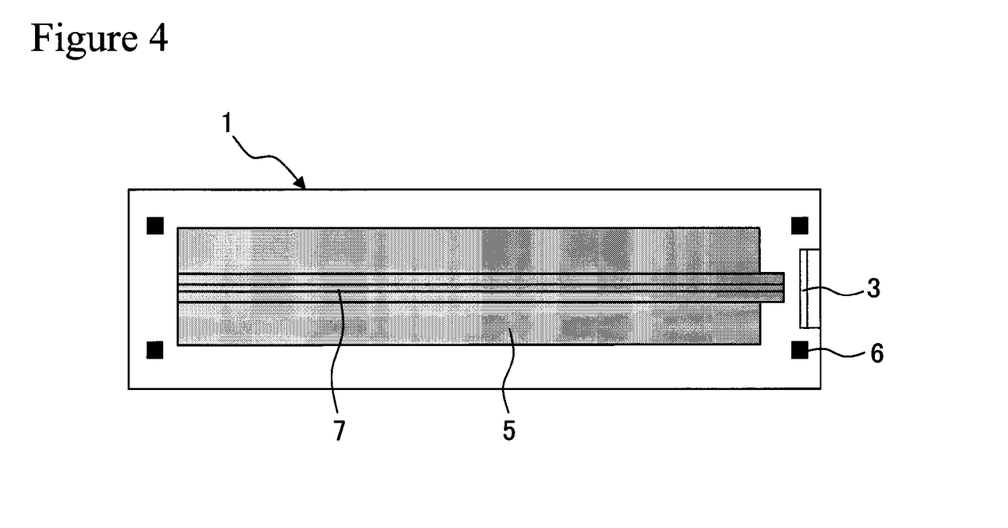
FIG. 4 is a schematic view of a semiconductor laser for the thermally assisted magnetic recording head assembly according to the embodiment.

In addition, the accuracy of the alignment marks 6 on the semiconductor laser 1 and the alignment marks (not shown) on the slider 20 including the waveguide has a large influence on optical coupling. Therefore, the accuracy of the two alignment marks is extremely important. FIG. 4 illustrates a plan view of the semiconductor laser 1, which is observed from the p-type electrode 5 side (the solder connection side with the submount 10).

Figure 5:
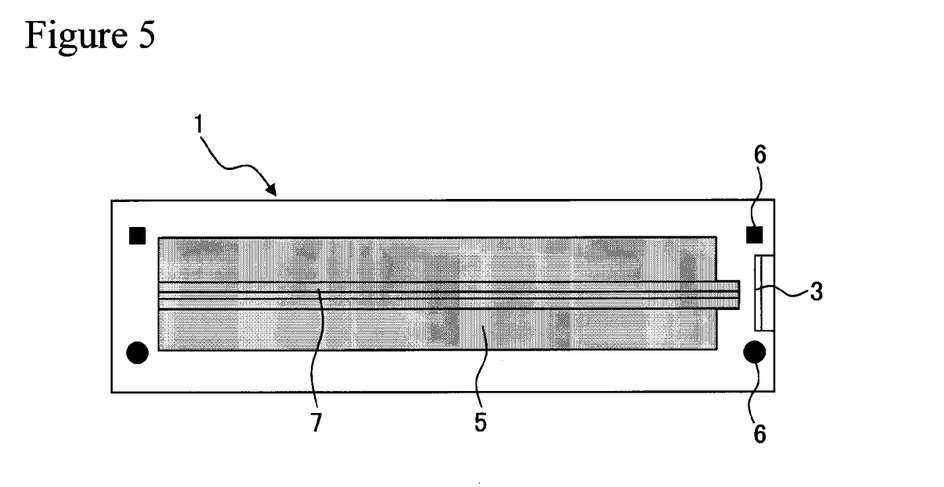
FIG. 5 is a schematic view of a semiconductor laser for the thermally assisted magnetic recording head assembly according to another embodiment.

In the case of the semiconductor laser, it is preferable to use the alignment marks 6 formed in a process of forming a mesa portion 7, for positioning in a perpendicular planar direction with respect to a resonance direction. It should be noted that, as illustrated in FIG. 5, it is desirable to change the shape of the alignment marks 6 in the perpendicular planar direction with respect to a resonator. The shape of the alignment marks 6 may have various patterns such as a circle, a rectangle, and a rhomboid and various sizes, and it is desirable to adopt a shape whose center can stay at the same position even if fluctuations occur.

Incidentally, in the semiconductor laser 1 in which the reflection mirror 3 is provided in an integrated manner, light is reflected to be outputted from the end surface thereof Therefore, a method of performing image recognition on an edge of the semiconductor laser 1 in consideration of a configuration of the p-type electrode 5 of the semiconductor laser 1, a thickness of the thin-film solder 11, and an angle of the reflection mirror 3; and then mounting with a shift by a correction amount is best suited to the positioning of the semiconductor laser 1 in the resonance direction.

On the other hand, in the case of the slider 20 including the waveguide, it is preferable to use the alignment marks (not shown) formed at the same time as a process of forming the core 23, for positioning in a width direction. With regard to a long-side direction of the slider 20 including the waveguide, in accordance with a laminate thickness of the core 23, it is necessary to perform image recognition on the alignment marks (not shown), and then add an offset thereto. After the slider 20 is mounted on the submount 10 by using the above-mentioned process, the first adhesive 30 and the second adhesive 31 are cured by UV and heat. Here, the stud 14 formed on the submount 10 is used for suppression of extreme inclination of the semiconductor laser 1, prevention of an outflow of the adhesives 30 and 31 into an unnecessary portion, trapping of outflowing gas, recognition of a range within which the adhesives 30 and 31 should be applied, and the like. It should be noted that, taking heat resistance of the magnetic head part into consideration, it is desirable to use as far as possible an adhesive which cures at a low temperature of approximately 100° C. In addition, when the adhesives 30 and 31 are applied to a position immediately below the p-type electrode 5 of the semiconductor laser 1 with the intermediation of the submount 10, a structure having the best heat radiation property can be obtained.

After that, in order to connect wiring lines 12, 16, and 25 of the submount 10 and the slider 20 including the waveguide to each other, solder balls 17 are placed on the submount 10, and the wiring lines are connected to each other by melting using a laser. A method of placing solders in a melting state onto a target region to thereby connect the wiring lines to each other can also be conceived as another method. In this case, Sn-3Ag-0.5Cu is generally used as the solders. Therefore, the temperature of the solders locally becomes equal to or higher than 250° C. In this way, at the time of the connection using the solders, a load of high temperature is given to even the first adhesive 30 and the second adhesive 31 which have already been cured. In particular, the second adhesive 31 applied onto the solder connection side is subjected to a load of higher temperature than that of the first adhesive 30. Therefore, a decrease in Young's modulus and hardness due to the high temperature appears remarkably. If a considerable decrease in Young's modulus and hardness of the adhesive occurs, a force generated at the time of solder solidification leads to deviation of an attachment position of the core 23 formed in the slider 20. In view of this, the Young's modulus of the first adhesive 30 is made higher than that of the second adhesive 31. This makes it possible to suppress the position deviation caused by the decrease in Young's modulus of the second adhesive 31, by means of the first adhesive 30. At this time, in addition to the Young's modulus, thermal conductivity of the second adhesive 31 is made smaller than that of the first adhesive 30, which makes it possible to also suppress thermal conduction to the first adhesive 30. As a result, it becomes possible to further suppress the decrease in Young's modulus of the first adhesive 30.

Next, the flexure 40 and the n-type electrode 4 of the semiconductor laser 1 (that is, the submount 10) are fixed to each other by a conductive adhesive 32, and the submount 10 and the flexure 40 are fixed to each other using a UV adhesive 33. It should be noted that, at this time, it is desirable to use, as the UV adhesive 33, an adhesive in which heat is used in addition to UV and to use, as the conductive adhesive 32, an adhesive in which UV is used in addition to heat curing. After that, the adhesives are cured by UV and heat similarly to the preceding process. It should be noted that, if the conductive adhesive 32 attaches to an active layer 2 of the semiconductor laser 1, a short circuit occurs. Therefore, it is preferable to make the conductive adhesive 32 thick to some degree, and it is desirable to make a distance between a connection surface of the submount 10 with the flexure 40 and the flexure 40 larger than a distance between the n-type electrode 4 of the semiconductor laser 1 and the flexure 40. Meanwhile, if the slider 20 and the flexure 40 are fixed to each other by only the thick portion of the adhesive, elastic deformation occurs during floating, and instability of the floating property is concerned. Accordingly, it is desirable that an adhesion thickness of the adhesive 33 which adheres the submount 10 and the flexure 40 to each other be made as small as possible by, for example, providing a stud (not shown) to the flexure 40.

Next, a wiring line 41 formed on the flexure 40 and the wiring lines 12 and 16 formed on the submount 10 are connected to each other by a solder. The connection method using the solder in this case is the same as the method used for connecting the wiring lines 16 and 25 of the submount 10 and the slider 20 to each other.

In general, according to the assembly procedure described above, the thermally assisted magnetic head assembly 100 is manufactured. In order to satisfy required performance, the optical coupling and the floating property are particularly important. In order to achieve highly-efficient optical coupling, it is essential that a distance between the semiconductor laser LD and the core 23 of the slider 20 including the waveguide be small and that an amount of position deviation between a peak portion of intensity distribution of the laser light of the semiconductor laser 1 and the central portion of the core 23 in the slider 20 including the waveguide be small.

Therefore, it is desirable that the thickness of the flat portion (bottom surface portion) of the concave portion 13 formed in the submount 10 be equal to or smaller than 20 μm.

In addition, with regard to the position deviation, in addition to the above-mentioned position deviation occurring at the time of the solder connection, position deviation occurring at the time of mounting the slider 20 on the adhesives 30 and 31 or at the time of curing the adhesives 30 and 31 also becomes problematic. In order to increase the accuracy at the time of mounting the slider 20 on the adhesives 30 and 31, in addition to the alignment marks 6 on the semiconductor laser 1 and the alignment marks (not shown) on the slider 20, areas and shapes of the adhesives 30 and 31 applied to the submount 10 are important. If the adhesives invade between the stud 14 and the slider 20 at the time of mounting, the adhesives cause a slip phenomenon in the case where an external force is applied to the slider 20. Therefore, it is essential to prevent the adhesives from being interposed between the stud 14 and the slider 20. In particular, the conductive adhesive which is the first adhesive 30 contains a large amount of metal particles such as silver. Therefore, if the conductive adhesive which is the first adhesive 30 invades between the stud 14 and the slider 20, the adhesive causes large position deviation. Therefore, particularly with regard to the first adhesive 30, it is essential to control the adhesion area thereof.

Further, the conductive adhesive tends to have a high viscosity, and if the viscosity is high, the adhesion thickness tends to increase. The increase in adhesion thickness brings about a decrease in optical coupling efficiency due to an increase in distance between the semiconductor laser 1 and the core 23 of the slider 20. Therefore, it is preferable to use adhesives having as low a viscosity as possible, as the two types of adhesives 30 and 31. In particular, it is desirable that the maximum filler size of the conductive adhesive contained in the first adhesive 30 be smaller than the thickness of the stud 14 and that an adhesive not containing filler be used as the second adhesive 31.

In a current hard disk device, the slider 20 is increasingly downsized. At present, a femto slider having a thickness of 230 μm is the thinnest, and the floating amount thereof is as small as approximately 10 nm. Therefore, if warpage on the order of several nm occurs non-uniformly, the floating property is deteriorated. Accordingly, in order to secure a satisfactory floating property, it is essential that the deformation amount of the slider 20 be small. In the thermally assisted magnetic head assembly 100 according to the embodiment, the semiconductor laser 1 is placed in the vicinity of the slider 20 in order to prioritize the optical coupling. Therefore, the deformation cause of the slider 20 includes not only the deformation conventionally occurring at the time of adhesion curing or resulting from a change in environment but also the deformation of the slider 20 due to the non-uniformity of heat distribution. Therefore, it is essential to secure a path of heat radiation to the slider 10, which is not required in a conventional magnetic head part.

In general, in order to reduce thermal resistance, it is necessary to set the thermal conductivity, the adhesion thickness, and the adhesion area to high, small, and large, respectively. Among these parameters, the adhesion thickness and the adhesion area cannot be changed significantly, but the thermal conductivity can be adjusted to such a degree that the order changes, and thus is a parameter suitable to perform effective heat radiation. In general, the thermal conductivity of an adhesive formed of acrylic, epoxy, and the like is approximately 0.2 W/mk, and an adhesive having a high thermal conductivity of several W/mk or higher contains a large amount of metal particles such as silver and thus tends to have a high Young's modulus. Adhesion of a large area using the adhesive having a high Young's modulus causes a problem that large warpage occurs at the time of adhesion curing and a change in environment (particularly at low temperature). Accordingly, in order to secure the heat radiation property and suppress warpage at the time of curing and a change in environment, it is essential to use two types of adhesives as in the case of the embodiment.

It is desirable to use, as the first adhesive 30 which serves for heat radiation among the above-mentioned two types of adhesives 30 and 31, an adhesive having a Young's modulus of 300 MPa or lower at room temperature, a Shore A hardness of 90 or lower, and a thermal conductivity of at least 2 W/mK or higher. In addition, it is preferable to make the adhesion area of the first adhesive 30 smaller than that of the second adhesive 31.

In addition, it is known that, in the case where a fillet is formed in an end portion of the slider 20 by using the above-mentioned first adhesive 30 and second adhesive 31, warpage becomes significantly large. Therefore, it is necessary to apply the first adhesive 30 and the second adhesive 31 to only the surface opposite to the floating surface (ABS) of the slider 20. It should be noted that, if the first adhesive 30 and the second adhesive 31 mix with each other, a decrease in physical property and a decrease in strength occur due to insufficient curing, and hence the adhesives need to be applied so as not to mix with each other.

(2) Embodiment 2

Figure 6:
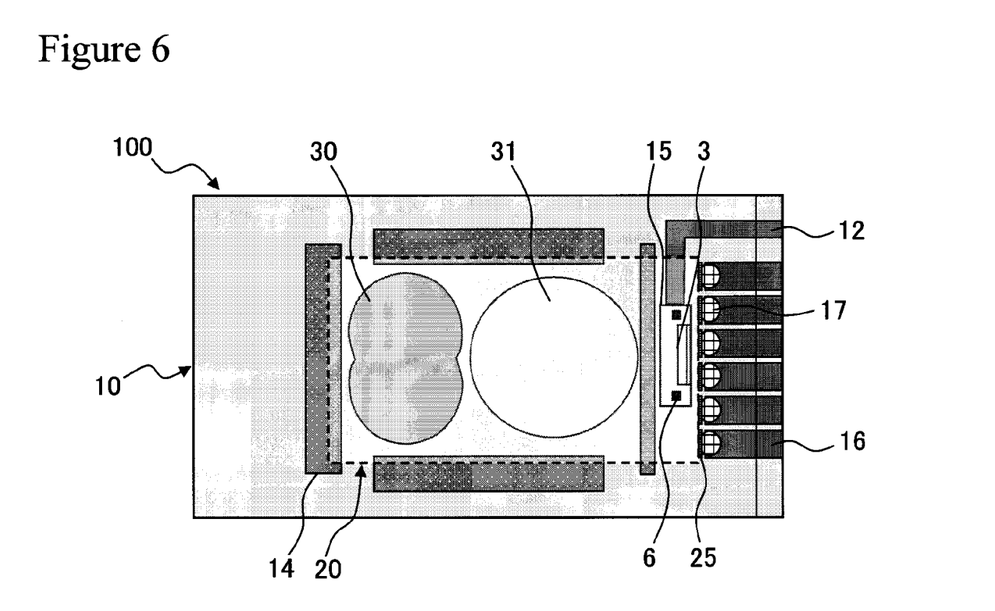
FIG. 6 is a plan view of the thermally assisted magnetic recording head assembly according to another embodiment, which is observed from the slider side.

FIG. 6 illustrates a planar structure example of the thermally assisted magnetic recording head assembly 100 according to Embodiment 2, which is observed from the slider 20 side. In the case of the present embodiment, the first adhesive 30 is applied a plurality of times (in the case of this figure, twice). This largely changes an apparent length of the first adhesive 30 in the short-side (width) direction of the slider 20. Normally, when an adhesive is applied by using a dispenser or the like, the adhesive is applied in the direction perpendicular to the submount 10 from the point of view of control. Therefore, the shape of the adhesive after application and mounting becomes a shape close to a circle. In the deformation of the slider 20, particularly, a change in the long-side direction has a more harmful influence on the floating property than a change in the short-side direction. In view of this, the first adhesive 30 is applied a plurality of times, to thereby form a shape longer in the short-side direction of the slider 20. As a result, it is possible to suppress the change in the long-side direction of the slider 20 and further secure the heat radiation property. However, applying an adhesive a plurality of times is not preferable from the point of view of productivity, and hence one-time application is desirable for the second adhesive 31.

(3) Embodiment 3

Figure 7:
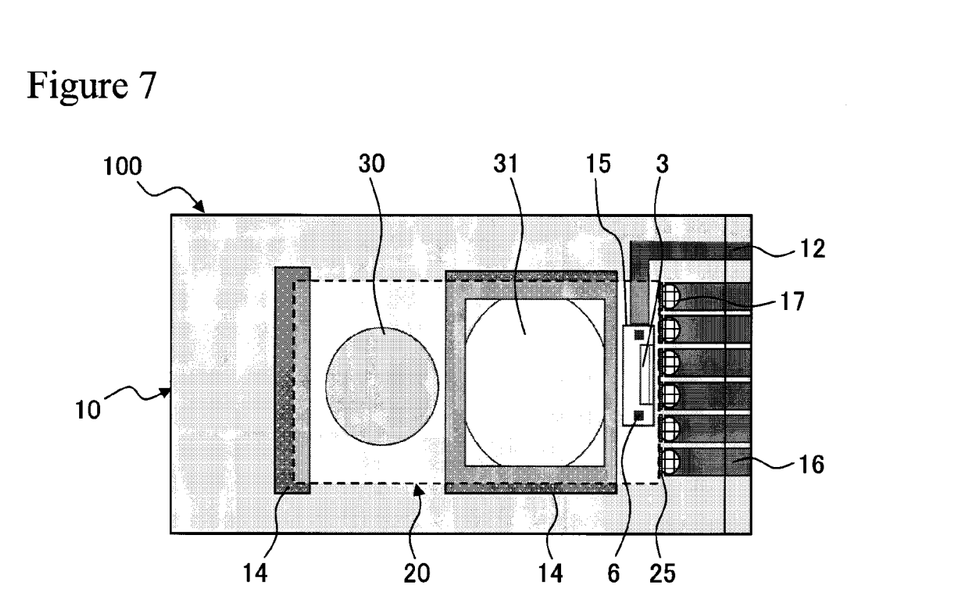
FIG. 7 is a plan view of the thermally assisted magnetic recording head assembly according to another embodiment, which is observed from the slider side.
Figure 8:
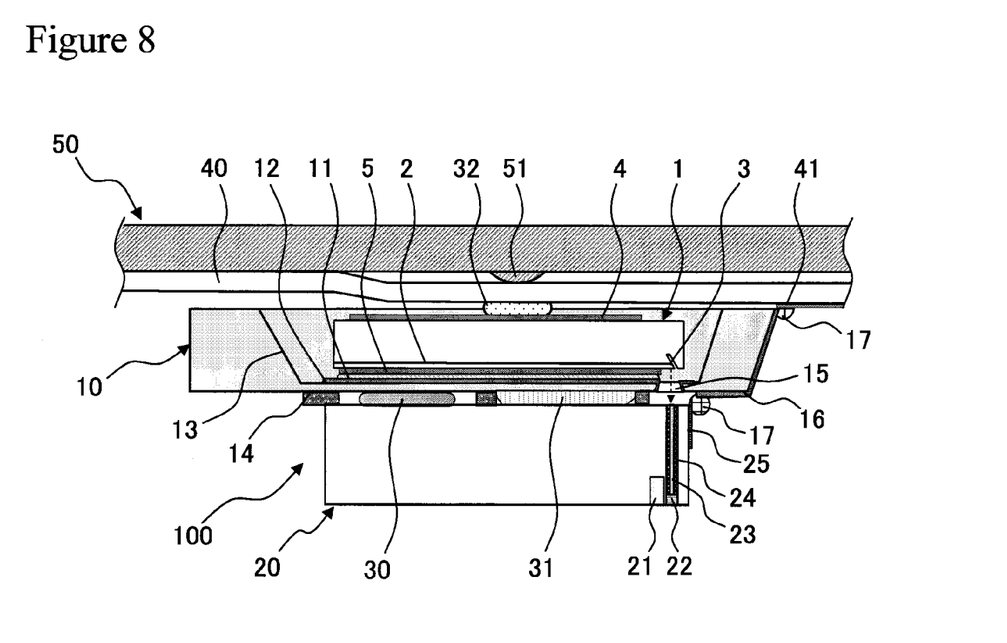
FIG. 8 is a view illustrating a cross sectional structure of the thermally assisted magnetic recording head assembly according to another embodiment.

FIG. 7 illustrates a planar structure example of the thermally assisted magnetic recording head assembly 100 according to Embodiment 3, which is observed from the slider 20 side. The present embodiment adopts a structure in which the second adhesive 31 is surrounded by the stud 14. As a matter of course, the stud 14 is formed first. FIG. 8 illustrates a cross sectional structure example of the thermally assisted magnetic recording head assembly 100 according to the present embodiment. An adhesive not containing filler is used as the second adhesive 31, which enables a smaller thickness and a lower Young's modulus. In return, the viscosity becomes excessively low in some cases. In such a case, when the stud 14 is placed around the second adhesive 31, even if the second adhesive 31 spreads out at the time of application, the adhesive is prevented from flowing out of the slider 20, and the area thereof can be controlled to some degree.

(4) Embodiment 4

Figure 9:
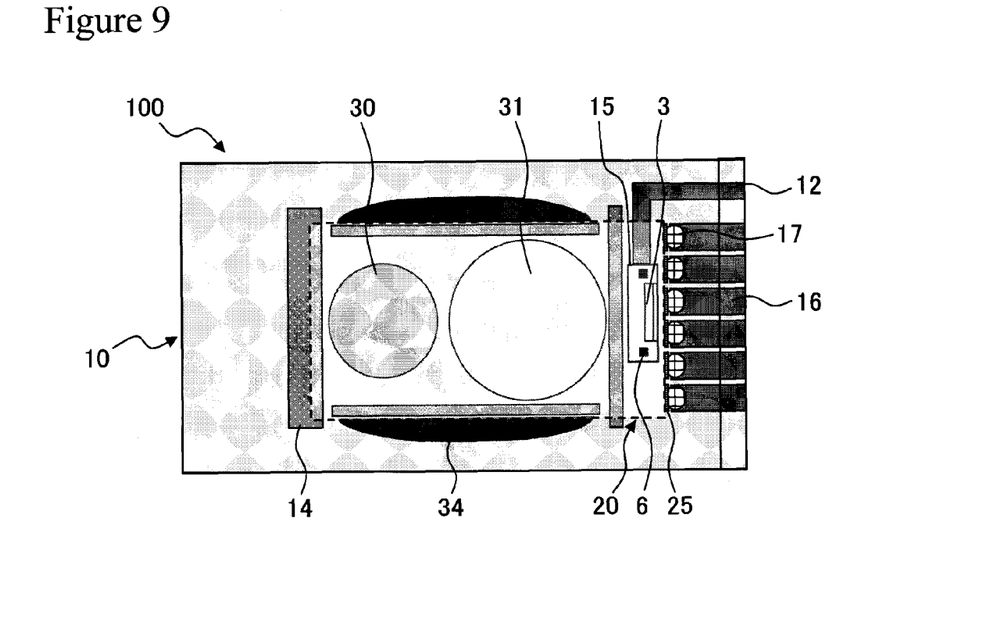
FIG. 9 is a plan view of the thermally assisted magnetic recording head assembly according to another embodiment, which is observed from the slider side.

FIG. 9 illustrates a planar structure example of the thermally assisted magnetic recording head assembly 100 according to Embodiment 4, which is observed from the slider 20 side. The present embodiment adopts a structure in which a fillet is formed of a heat radiation material 34 having a high thermal conductivity in both end portions extending in the long-side direction of the slider 20 with the intermediation of the submount 10. As has been described above, it is preferable that the thermal conductivity of the first adhesive 30 be high. On the other hand, an adhesive having a high thermal conductivity tends to have a high Young's modulus, and hence adhesion of a large area is difficult from the point of view of warpage. In view of this, in the case where the heat radiation property is difficult to secure by means of the above-mentioned structure, the heat radiation material 34 is placed in both ends of the slider 20 with the intermediation of the submount 10, whereby a heat radiation path can be secured. In particular, in the case of the heat radiation material 34, the adhesion thickness does not need to be taken into consideration, and the viscosity may be high to some degree. Therefore, it is possible to cause the adhesive to contain $Al_2O_3$ or $SiO_2$ filler having a large ground size which enables easier formation of the heat radiation path. It should be noted that it is preferable to use, as the heat radiation material 34, not an acrylic or epoxy type exhibiting a large adhesion strength but a type which does not have a large adhesive force and contains a silyl group, such as a moisture curing resin which reacts to be cured by moisture contained in the air. However, such a moisture curing resin contains alcohol components and may flow out at the time of application thereof in some cases, and hence it is desirable to provide the stud 14 to the submount 10 in order to prevent the resin from attaching to the first adhesive 30 and the second adhesive 31. It should be noted that the heat radiation material 34 needs not to contain as far as possible a material which is considered to attach to a magnetic disk 61, such as organic Sn and low-molecular siloxane.

(5) Embodiment 5

Figure 10:
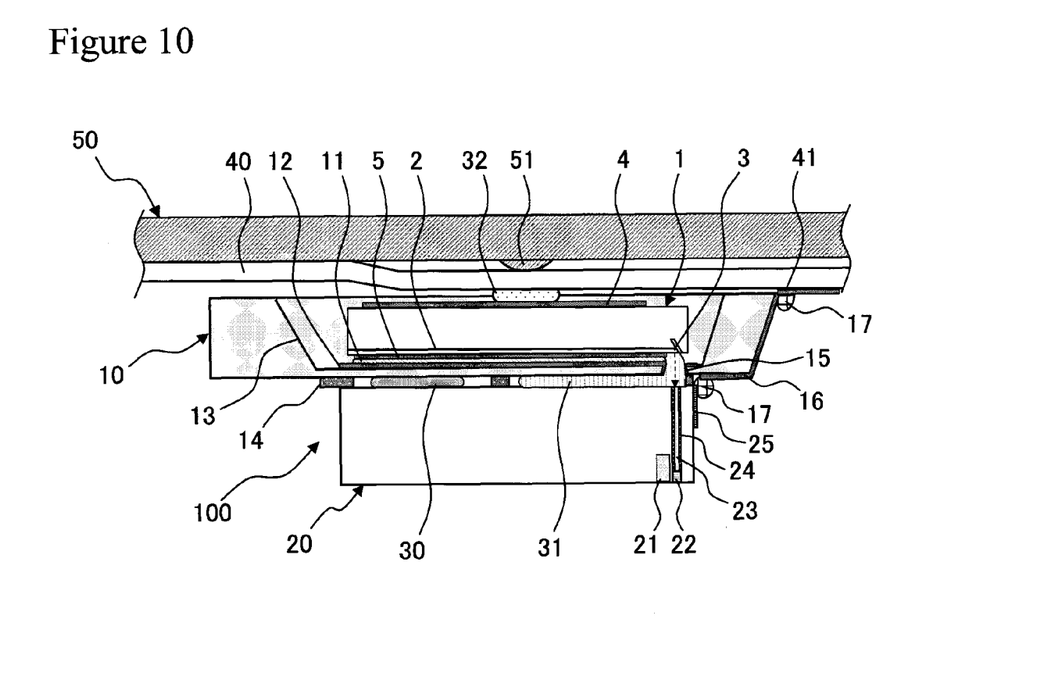
FIG. 10 is a view illustrating a cross sectional structure of the thermally assisted magnetic recording head assembly according to another embodiment.
Figure 11:
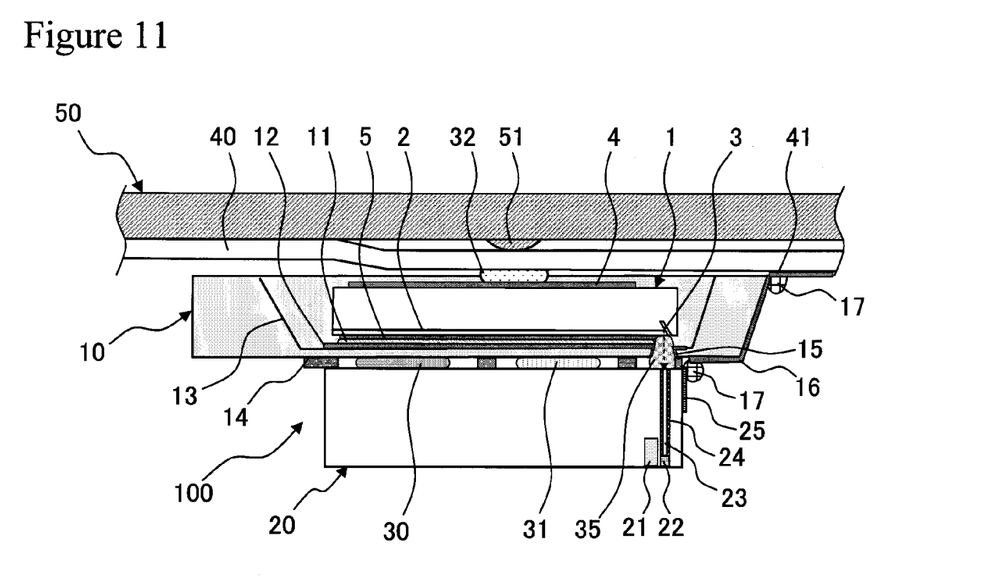
FIG. 11 is a view illustrating a cross sectional structure of the thermally assisted magnetic recording head assembly according to another embodiment.

FIG. 10 illustrates a cross sectional structure example of the thermally assisted magnetic recording head assembly 100 according to Embodiment 5. The present embodiment adopts a structure in which a space between a surface from which the light of the semiconductor laser 1 is emitted and the core 23 of the slider 20 is filled with the second adhesive 31. In the case of the above-mentioned embodiments, a distance between the semiconductor laser 1 and the core 23 of the slider 20 is several 10 μm, which is small but not zero, and the light of the semiconductor laser 1 enters while spreading wider than the core diameter of the slider 20. As a result, only a certain part of the laser light can be used for optical coupling, and a slight decrease in optical coupling efficiency is found. Therefore, when the space is filled with a material which is transparent and has a refractive index larger than that of air, the spreading of the emitted light of the semiconductor laser 1 can be suppressed, and an effective distance until the same spot size is reached can be made smaller. In addition, when the space is filled with the material which has the refractive index larger than that of air, reflection on the core 23 can also be suppressed. It should be noted that, as a countermeasure against a reduction in reflectance, an antireflection film may be formed on a surface from which the light enters the core 23. It is desirable that a refractive index of the transparent second adhesive 31 for filling be equal to or larger than 1.5, and it is desirable to use an adhesive which has a transmittance of 98% or higher to a wavelength of the entering laser and has satisfactory resistance to light. In this condition, it is desirable to use an adhesive having excellent resistance to light as the second adhesive 31. It should be noted that, in the case of adopting this connection structure, it is desirable to provide the stud 14 between the through hole 15 and the solder connection portion as illustrated in FIG. 10. Further, when an inclined surface of the through hole 15 and an inclined surface reaching the mounting surface of the semiconductor laser 1 are coated with a material having surface free energy smaller than those of adhesives of Au and the like, it is possible to prevent the second adhesive 31 from being applied to the coated portion, which facilitates the filling It should be noted that description is given above of the case where the adhesive used for filling the space between the semiconductor laser 1 and the core 23 of the slider 20 including the waveguide is the second adhesive 31, but as illustrated in FIG. 11, a third adhesive 35 different from the second adhesive 31 may be used for filling. As described above, the second adhesive 31 is required to have a low viscosity. Therefore, in the case where the second adhesive 31 is applied to a surface portion of the reflection mirror 3 before the slider 20 is mounted, the filling therewith may not be possible. In this case, it is preferable to fill the space with the third adhesive 35 having a higher viscosity than that of the second adhesive 31. It should be noted that it is desirable to use, as the filling material, an adhesive not containing filler or containing filler which is sufficiently smaller than the wavelength of the entering laser.

(6) Embodiment 6

Figure 12:
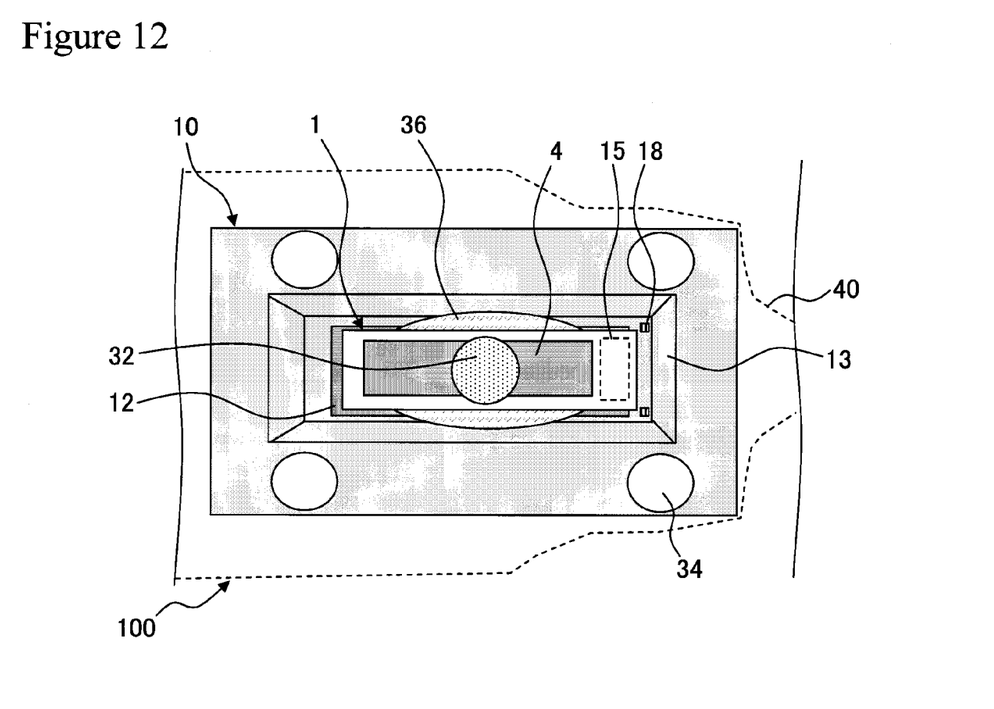
FIG. 12 is a plan view of the thermally assisted magnetic recording head assembly according to another embodiment, which is observed from the flexure side.

FIG. 12 illustrates a planar structure example of the thermally assisted magnetic recording head assembly 100 according to Embodiment 6, which is observed from the flexure 40 side. The present embodiment adopts a structure in which part of a periphery of the active layer 2 of the semiconductor laser 1 is sealed by a resin 36. In the case of the present embodiment, the n-type electrode 4 of the semiconductor laser 1 is formed on a surface opposite to the p-type electrode 5, and hence it is necessary to bring the n-type electrode 4 into electrical contact with the flexure 40 via the conductive adhesive 32. However, as described above, a width of the semiconductor laser 1 is as small as approximately 200 μm. Therefore, if the conductive adhesive 32 flows out to reach the active layer 2 of the semiconductor laser 1 at the time of the connection between the n-type electrode 4 and the flexure 40 and thus makes contact with even part of the active layer 2, a short circuit occurs. In view of this, in the present embodiment, a portion of the active layer 2 of the semiconductor laser 1 to the vicinity of which the conductive adhesive 32 is applied is surrounded by the resin 36. It should be noted that, in terms of workability, it is preferable to use, as the resin 36, an adhesive which utilizes UV and has high insulation properties or a thermoplastic resin as well as a material having a low Young's modulus. In the case where the semiconductor laser 1 is surrounded by the resin 36 even in the resonance direction thereof, the reflection property changes, and hence it is necessary to make a design according to a refractive index of the resin 36.

(7) Embodiment 7

Figure 13:
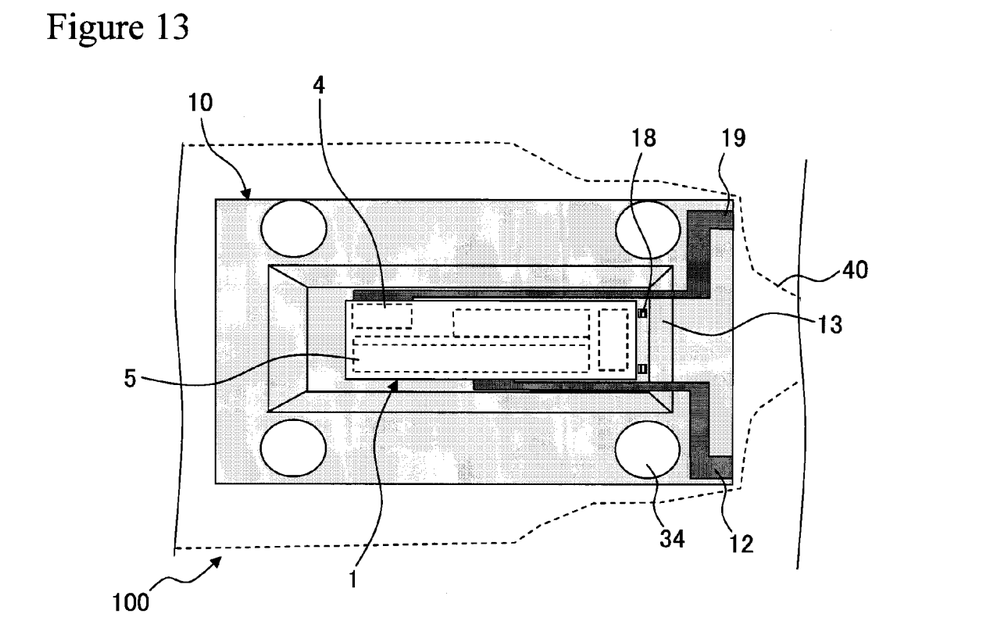
FIG. 13 is a plan view of the thermally assisted magnetic recording head assembly according to another embodiment, which is observed from the flexure side.

FIG. 13 illustrates a planar structure example of the thermally assisted magnetic recording head assembly 100 according to Embodiment 7, which is observed from the flexure 40 side. In the case of the present embodiment, the p-type electrode 5 and the n-type electrode 4 of the semiconductor laser 1 are placed on the same surface, and the semiconductor laser 1 is mounted on a portion of the thin-film solder 11 in the concave portion 13 formed in the submount 10. The adoption of this structure makes it possible to considerably reduce the possibility of a short circuit caused by the conductive adhesive 32.

(8) Embodiment 8

Figure 14:
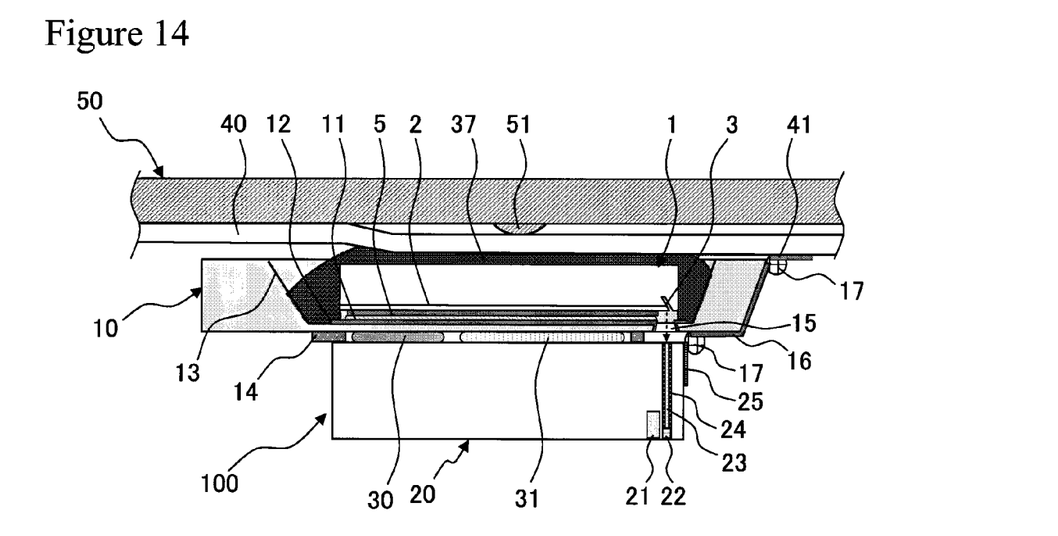
FIG. 14 is a view illustrating a cross sectional structure of the thermally assisted magnetic recording head assembly according to another embodiment.

FIG. 14 illustrates a cross sectional structure example of the thermally assisted magnetic recording head assembly 100 according to Embodiment 8. In the case of a magnetic disk device, a distance between the floating surface (ABS) and the magnetic disk 61 is approximately 10 nm. Therefore, if dust on the order of several μm to several 10 μm attaches to an upper surface of the magnetic disk 61, a serious trouble occurs in reproduction and recording of the magnetic disk 61. In general, in a manufacturing process of the semiconductor laser 1, the semiconductor laser 1 is made smaller by using cleavage, so that there is a fear that dust thereof remains attached to the vicinity of the semiconductor laser 1 and comes off during floating. In view of this, the present embodiment adopts a structure in which, even if dust attaches to the semiconductor laser 1, a periphery of the semiconductor laser 1 is covered by a resin 37, to thereby prevent the dust from coming off during floating to attach to the upper surface of the magnetic disk. It should be noted that the resin 36 described in Embodiment 6 may be used as the resin 37. The structure according to the present embodiment is not limitatively applied to the case where electrodes are formed on both sides of the semiconductor laser 1, and can be preferably applied to any structures described above.

(9) Embodiment 9

Figure 15:
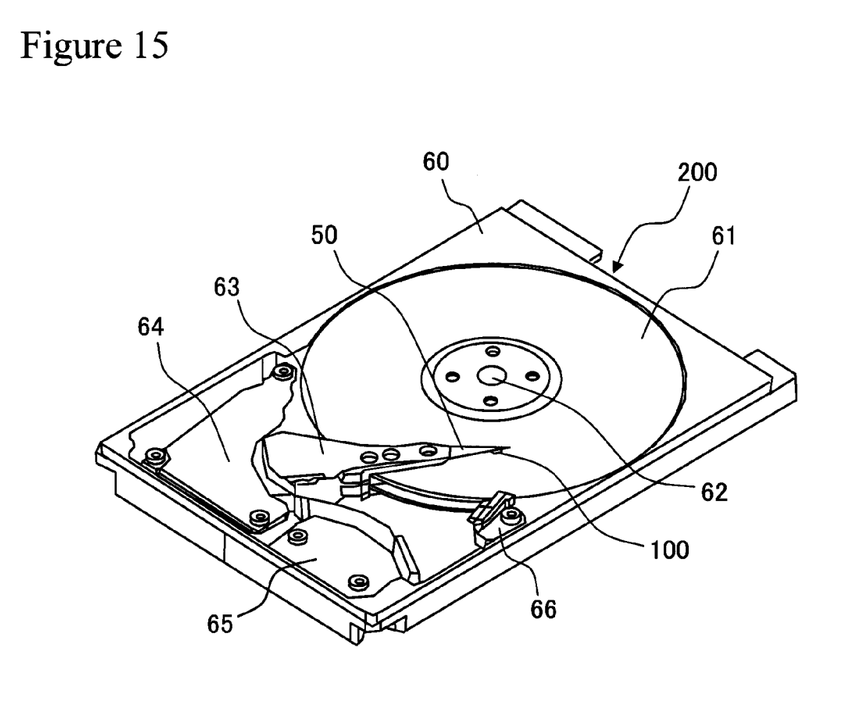
FIG. 15 is a schematic view of a hard disk drive device on which the thermally assisted magnetic head assembly according to the embodiment is mounted.

FIG. 15 is a view illustrating a schematic structure example of a magnetic disk drive device 200 on which the above-mentioned thermally assisted magnetic recording head assembly 100 is mounted. The magnetic disk 61 which is a recording medium is placed in a casing 60 of the hard disk drive device 200, and the disk 61 is rotated by a spindle motor 62 at high speed. The thermally assisted magnetic recording head assembly 100 according to the embodiment is mounted on one end of a suspension 50, and an arm 63 is connected to another end thereof. The arm 63 is driven by a voice coil motor 64, and moves the thermally assisted magnetic recording head assembly 100 to a recording position of the rotationally driven magnetic disk 61. An LSI 65 for signal processing which processes write and read information of recording data is also placed in the casing 60.

INDUSTRIAL APPLICABILITY

The use of the present invention makes it possible to suppress: position deviation occurring when a slider including a waveguide is mounted on a submount and when an adhesive is cured; and position deviation occurring when the slider including the waveguide and the submount are connected to each other by a solder after the curing of the adhesive. This can realize satisfactory optical coupling between the submount and the slider including the waveguide. In addition, a warpage amount of the slider during the curing of the adhesion can be reduced. Further, as a result of highly-efficient heat radiation to the slider, even non-uniform deformation of the slider during an operation of a semiconductor laser can be reduced. This can satisfy a stable floating property. In addition, this can considerably contribute to an extension of the lifetime of the semiconductor laser. With the above-mentioned effects, it is possible to realize a thermally assisted magnetic recording head assembly which satisfies both of optical coupling and a floating property.

The invention claimed is:

1. A thermally assisted magnetic head assembly, comprising:
    a slider including a magnetic head part, an optical waveguide, and a near field element;
    a submount on which a semiconductor laser and a mirror are mounted, the mirror being placed at one end of the semiconductor laser in a resonance direction thereof and reflecting a laser in a direction intersecting with the resonance direction; and
    first and second adhesives which fix the slider and the submount to each other on an attachment surface, wherein:
    at least parts of the first and second adhesives are applied to a position opposed to the semiconductor laser with an intermediation of the submount; and
    the first adhesive having a higher Young's modulus than that of the second adhesive is applied onto an inflow end side of the slider including a solder connection portion, the second adhesive being applied onto an outflow end side of the slider.

2. The thermally assisted magnetic head assembly according to claim 1, wherein thermal conductivity of the first adhesive is higher than that of the second adhesive.

3. The thermally assisted magnetic head assembly according to claim 2, wherein:
    thicknesses of the first and second adhesives are set so as not to be the same as a distance between the slider and the submount; and
    the first and second adhesives do not flow out of an end portion of the slider.

4. The thermally assisted magnetic head assembly according to claim 3, wherein the semiconductor laser is mounted so that an entirety thereof is housed in a concave portion formed in the submount.

5. The thermally assisted magnetic head assembly according to claim 4, wherein:
    at least two alignment marks on the semiconductor laser are formed symmetrically with respect to a mesa portion; and
    shapes of the at least two alignment marks located symmetrically are different from each other.

6. The thermally assisted magnetic head assembly according to claim 4, wherein a maximum size of filler in the first adhesive is smaller than a height of a stud formed on the submount.

7. The thermally assisted magnetic head assembly according to claim 4, wherein a portion between the waveguide and a surface of the semiconductor laser through which light passes is filled with the transparent second adhesive or a transparent third adhesive.

8. The thermally assisted magnetic head assembly according to claim 4, wherein part of a periphery of an active layer of the semiconductor laser is surrounded by the first and second adhesives or a thermoplastic resin.

9. The thermally assisted magnetic head assembly according to claim 4, wherein a part or an entirety of an end portion of the semiconductor laser is surrounded by an adhesive or a thermoplastic resin.

10. The thermally assisted magnetic head assembly according to claim 4, wherein a fillet is formed in at least part of end portions of the slider and the submount by using a heat radiation material.

11. The thermally assisted magnetic head assembly according to claim 10, wherein an elastic modulus or a hardness of the heat radiation material is smaller than those of the first and second adhesives.

12. The thermally assisted magnetic head assembly according to claim 4, wherein an outer peripheral portion of the second adhesive is surrounded by a stud formed on the submount.

13. The thermally assisted magnetic head assembly according to claim 4, wherein an adhesion area of the second adhesive is larger than an adhesion area of the first adhesive.

14. A magnetic disk drive device, comprising:
    a thermally assisted magnetic head assembly including:
    a slider including a magnetic head part, an optical waveguide, and a near field element; and
    a submount on which a semiconductor laser and a mirror are mounted, the mirror being placed at one end of the semiconductor laser in a resonance direction thereof and reflecting a laser in a direction intersecting with the resonance direction,
    the slider and the submount being fixed to each other by first and second adhesives,
    the thermally assisted magnetic head assembly having a structure in which:
    at least parts of the first and second adhesives are applied to a position opposed to the semiconductor laser with an intermediation of the submount; and
    the first adhesive having a higher Young's modulus than that of the second adhesive is applied onto an inflow end side of the slider including a solder connection portion, the second adhesive being applied onto an outflow end side of the slider;

a suspension having one end on which the thermally assisted magnetic head assembly is mounted;
an arm connected to another end of the suspension;
a drive part which drives the arm to a predetermined position;
a magnetic disk on or from which data is recorded or reproduced by the magnetic head part and the near field element or by the magnetic head part; and
a spindle motor which rotationally drives the magnetic disk at high speed.

* * * * *